United States Patent
Jeong (10) Patent No.: US 8,384,321 B2
(45) Date of Patent: Feb. 26, 2013

(54) MOTOR, APPARATUS FOR CONTROLLING MOTOR, AND METHOD FOR STARTING MOTOR

(75) Inventor: Ji-Youn Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 337 days.

(21) Appl. No.: 12/810,277

(22) PCT Filed: Sep. 24, 2008

(86) PCT No.: PCT/KR2008/005676
§ 371 (c)(1),
(2), (4) Date: Jun. 23, 2010

(87) PCT Pub. No.: WO2009/096649
PCT Pub. Date: Aug. 6, 2009

(65) Prior Publication Data
US 2010/0277112 A1    Nov. 4, 2010

(30) Foreign Application Priority Data
Jan. 31, 2008    (KR) .................. 10-2008-0009994

(51) Int. Cl.
*H02P 21/00* (2006.01)

(52) U.S. Cl. ............ 318/400.02; 318/400.01; 318/700; 318/400.14; 318/400.17; 318/596; 318/599; 318/609; 318/55; 318/59; 318/62; 318/430; 318/721

(58) Field of Classification Search .............. 318/596, 318/599, 609, 400.02, 700, 400.01, 400.14, 318/400.17, 55, 59, 62, 430, 721
See application file for complete search history.

(56) References Cited

U.S. PATENT DOCUMENTS

| | | | | |
|---|---|---|---|---|
| 6,163,127 A * | 12/2000 | Patel et al. | | 318/700 |
| 6,281,656 B1 * | 8/2001 | Masaki et al. | | 318/700 |
| 6,737,828 B2 * | 5/2004 | Kiuchi et al. | | 318/779 |
| 6,774,592 B2 * | 8/2004 | Walters et al. | | 318/400.09 |
| 7,050,929 B2 * | 5/2006 | Norell et al. | | 702/151 |
| 2003/0034751 A1 | 2/2003 | Walters | | |
| 2006/0108968 A1 * | 5/2006 | Blodow | | 318/719 |
| 2006/0284581 A1 * | 12/2006 | Mullin et al. | | 318/362 |

FOREIGN PATENT DOCUMENTS

| | | |
|---|---|---|
| EP | 1 320 187 A2 | 6/2003 |
| KR | 10-1994-0006963 B | 4/1994 |
| KR | 10-0122861 B | 11/1997 |
| KR | 10-0136116 B | 1/1998 |
| KR | 10-1999-025251 A | 4/1999 |
| KR | 10-2006-0075705 A | 7/2006 |

* cited by examiner

*Primary Examiner* — Rita Leykin
(74) *Attorney, Agent, or Firm* — McKenna Long & Aldridge LLP (57) ABSTRACT

When it is determined that a rotor is initially in a stationary state, a current vector is applied to a coil by a vector control method so as to rotate the rotor in a forward direction from a present position of the rotor regardless of a predetermined start position of the rotor. Therefore, a motor can be stably started with less power consumption and noise/vibration.

11 Claims, 7 Drawing Sheets

MOTOR, APPARATUS FOR CONTROLLING MOTOR, AND METHOD FOR STARTING MOTOR

This application is a 35 U.S.C. §371 National Stage entry of International Application No. PCT/KR2008/005676, filed on Sep. 24, 2008, and claims priority to Korean Application No. 10-2008-0009994, filed on Jan. 31, 2008 each of which is hereby incorporated by reference in its entirety as if fully set forth herein.

TECHNICAL FIELD

The present disclosure relates to a motor, an apparatus for controlling a motor, and a method for starting a motor.

BACKGROUND ART

A synchronous motor is a motor of which the speed can be controlled based on a frequency applied from a motor control unit. Generally, a synchronous motor is started after aligning a rotor of the synchronous motor. Then, the rotor speed of the synchronous motor is increased by gradually increasing a control frequency.

Figure 10:
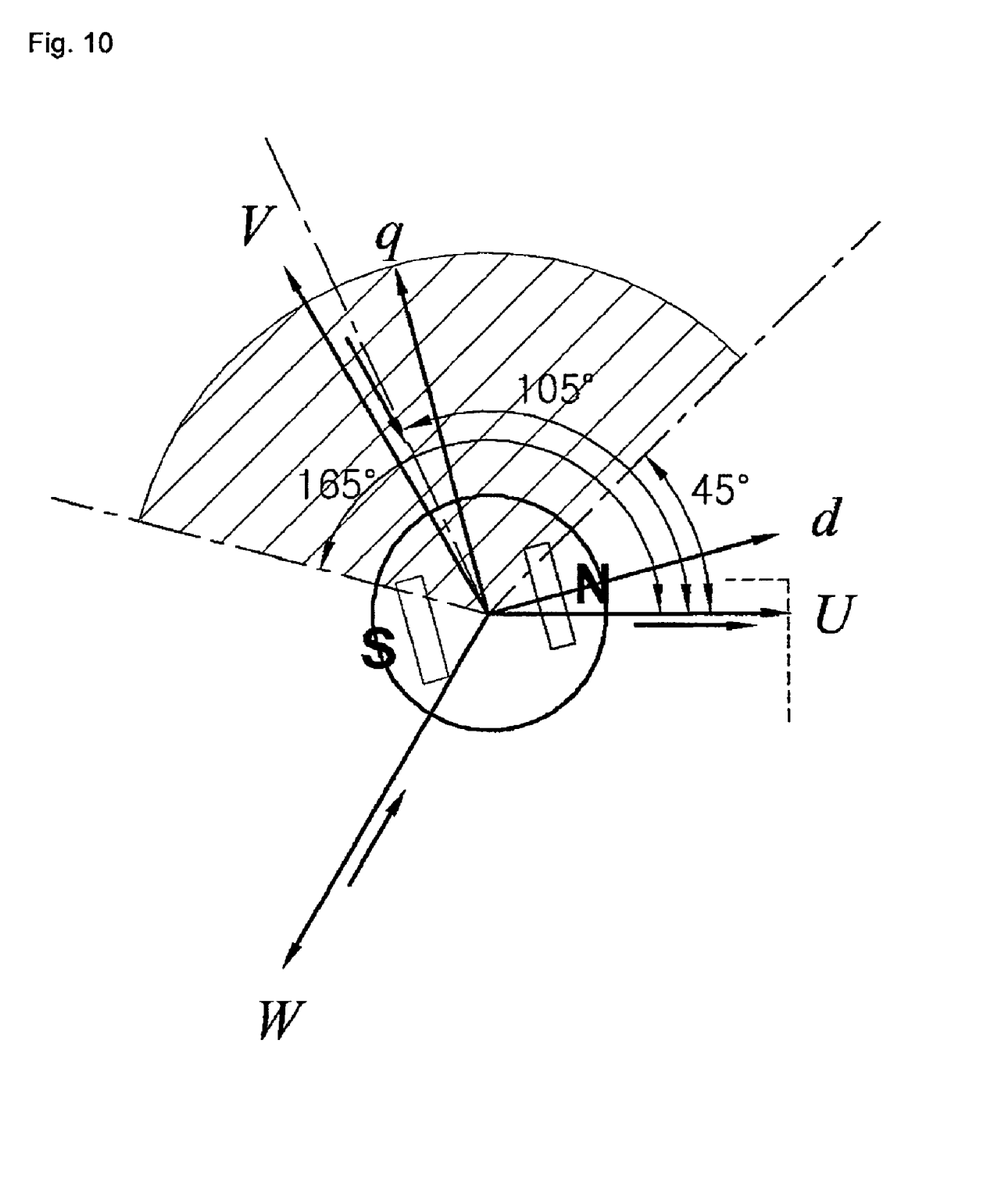
FIG. 10 illustrates coordinates system for explaining a method of aligning a motor rotor.

FIG. 10 illustrates coordinates system for explaining a method of aligning a motor rotor.

Referring to FIG. 10, U, V, and W denote axes passing through centers of stator coils of a motor; d denotes an axis defined in a main flux direction that varies with a rotor of the motor; and q denotes an axis angled 90 degrees in electric angle from the d-axis in a forward direction. N an S denote the positions of N and S poles of magnets of the rotor, respectively. It is configured such that when a current is applied in the direction of the d-axis, the motor stops, and when a current is applied in the direction of the q-axis, the motor rotates. In the above, the UVW coordinate system is a stationary coordinate system, and the d-q coordinate system is a rotating coordinate system.

In the above-defined coordinate systems, when it is intended to forcibly align the motor rotor before starting the motor, an alignment current can be applied as a current vector defined in the d-axis direction. For example, a pulse current vector is applied a plurality of times in the direction of the d-axis.

A load can be applied to an object connected to a rotation shaft of the motor, or the object can be in motion. For example, a fan of an outdoor unit of an air conditioner can be rotated by a wind. In this case, a fan driving motor connected to the fan is started in a state where the fan is already rotated in a forward or reverse direction.

Thus, in this case, the fan may wobble or vibrate when an alignment current is momentarily applied in the d-axis direction. Furthermore, due to the rotational inertia of the fan, if the alignment current is not correspondingly great, a rotor of the fan driving motor is not aligned to an initial position. Moreover, due to the increase of the alignment current, power consumption increases.

DISCLOSURE OF INVENTION

Technical Problem

Accordingly, embodiments provide a motor, an apparatus for controlling a motor, and a method of staring a motor that are designed in a manner such that although disturbance such as a strong wind is applied to the motor, the motor can be stably started with less power consumption for initial alignment of a rotor, and less initial noise and vibration.

Technical Solution

In one embodiment, a motor includes a stator around which a coil is wound, a rotor having a permanent magnet spaced a predetermined distance from the stator, and a hall sensor disposed at the stator to detect a present position and a present speed of the rotor, the motor being characterized in that the motor further includes a motor control unit, wherein when the rotor is initially in a stationary state, the motor control unit applies a current vector to the coil by a vector control method so as to rotate the rotor in a forward direction from the present position of the rotor regardless of a predetermined start position of the rotor. Therefore, the motor can be stably started with less power consumption, noise, and vibration.

The hall sensor may be at least three in number for properly detecting the position of the rotor. The motor control unit may not apply a forced alignment current to the coil in a predetermined direction regardless of the state of the rotor. When the rotor is initially not in a stationary state, the motor control unit may decelerate the rotor substantially to a stationary state by varying a current vector using a vector control method.

When the rotor starts to rotate from the stationary state, a stepped phase current may be applied to the coil.

In another embodiment, there is provided an apparatus for controlling a motor, the apparatus including: a speed controller configured to generate a d-axis reference current Id* and a q-axis reference current Iq* based on a d-q rotating coordinate system defined by a d-axis parallel with a magnetic flux direction of a permanent magnet and a q-axis perpendicular to the magnetic flux direction; a current controller configured to generate a d-axis reference voltage Vd* and a q-axis reference voltage Vq* based on the d-axis reference current Id* and the q-axis reference current Iq*; a pulse width modulation (PWM) calculator configured to generate a PWM signal based on the d-axis reference voltage Vd* and the q-axis reference voltage Vq*; an inverter configured to generate a current using the PWM signal for applying the current to the motor; and a speed/position detector configured to detect a speed and a position of a rotor of the motor, wherein when the speed/position detector detects that the rotor is in a stationary state, the speed controller outputs a reference current to cause the rotor to start rotating in a forward direction.

When the rotor is not in a stationary state, a variable current vector may be applied by a vector control method to stop the rotor substantially, and then the rotor may be rotated in the forward direction. Here, the current vector may include at least a q-axis component in the d-q rotating coordinate system.

In further another embodiment, there is provided a method for starting a motor, the method including: detecting a position and a speed of a rotor; and when the rotor is in a stationary state, applying a current vector according to a vector control method so as to cause the rotor to start rotating from a stationary position in a forward direction.

When the detected speed of the rotor is a forward or reverse speed, the rotor may be decelerated substantially to a stationary state, and then the rotor is started to rotate. The rotor may be started to rotate by the vector control method no matter whether the rotor is in a stationary state or the speed of the rotor is a forward or reverse speed.

A unidirectional forced alignment current may be not applied regardless of an initial state of the rotor.

The position of the rotor may be detected using a combination of on/off signals output from at least three hall sensors disposed at a stator. The position of the rotor may be detected with resolution of 60 degrees.

The details of one or more embodiments are set forth in the accompanying drawings and the description below. Other features will be apparent from the description and drawings, and from the claims.

Advantageous Effects

According to the present disclosure, a motor can be started more reliably with less initial power consumption, noise, and vibration.

BEST MODE FOR CARRYING OUT THE INVENTION

Reference will now be made in detail to the embodiments of the present disclosure, examples of which are illustrated in the accompanying drawings.

Figure 1:
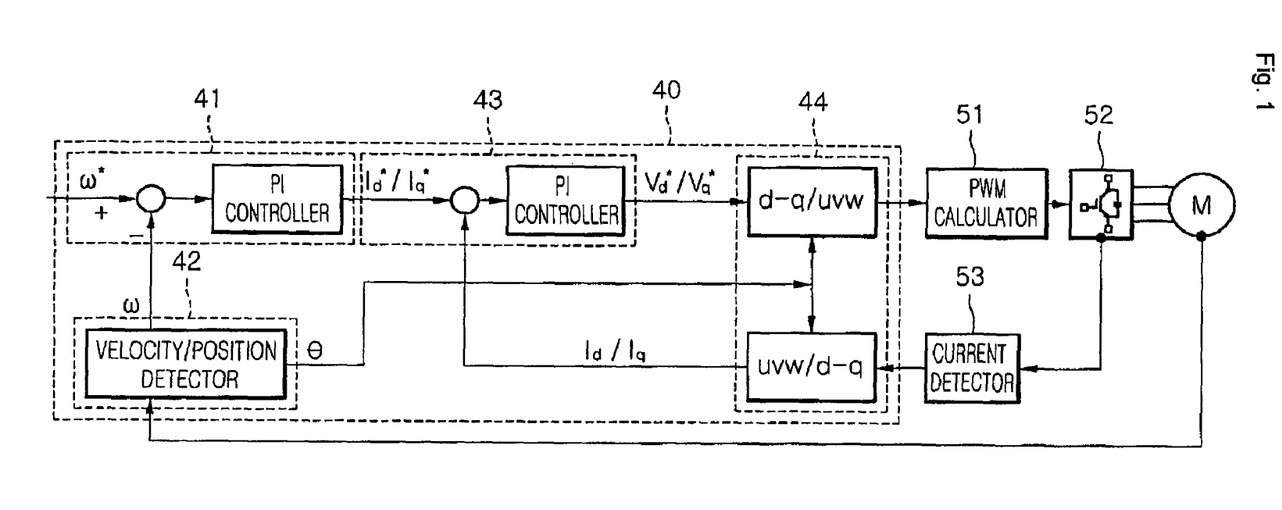
FIG. 1 is a block diagram illustrating a motor and an apparatus for controlling the motor according to an embodiment.

FIG. 1 is a block diagram illustrating a motor M and an apparatus for controlling the motor according to an embodiment.

Referring to FIG. 1, a motor control unit 40 controls power input to the motor M. A pulse width modulation (PWM) calculator 51 receives a signal of an uvw stationary coordinate system from the motor control unit 40 and generates a PWM signal. An inverter 52 receives the PWM signal and controls power input to the motor M directly. A current detector 53 detects a d-axis present current Id and a q-axis present current Iq that are output from the inverter 52.

The motor M includes a stator around which a coil is wound, and a rotor having permanent magnets for generating electromagnetic forces through interaction with the coil. At least one hall sensor may be provided as means for detecting positions of the permanent magnets of the rotor to detect the position and speed of the rotor.

The motor control unit 40 includes a speed/position detector 42, a speed controller 41, a current controller 43, and a coordinate converter 44. The speed/position detector 42 detects the speed and rotation position of the rotor of the motor M. The speed controller 41 compares a present speed ω of the rotor detected by the speed/position detector 42 with a reference speed ω* and adjusts current components (that is, the present currents Id and Iq) on a d-q rotating coordinate system defined by a d-axis parallel with the flux direction of the permanent magnet and a q-axis perpendicular to the flux direction of the permanent magnet, so as to generate a d-axis reference current Id* and a q-axis reference current Iq* for making the present speed ω of the rotor follow the reference speed ω*. The current controller 43 generates a d-axis reference voltage Vd* and a q-axis reference voltage Vq* by performing an proportional integral (PI) operation using present currents Id and Iq based on the d-axis reference current Id* and the q-axis reference current Iq* generated by the speed controller 41. The coordinate converter 44 is used for coordinate system conversion between the d-q rotating coordinate system and the uvw stationary coordinate system.

The speed/position detector 42 may detect the speed and position of the rotor of the motor M using signals detected by, for example, three hall sensors installed at the motor M (specifically, at the stator of the motor M). Since the hall sensors can detect the position of the rotor per electric angle of 60 degrees, the position of the rotor can be detected with resolution of 60 degrees in electric angle. If the number of the hall sensors decreases, the detection resolution decreases. Although the detection resolution decreases, the motor M can be operated but vibration and noise may increase due to the decreased resolution.

The above-described method of controlling a phase current by adjusting d-axis and q-axis currents of a rotating coordinate system is substantially the same as a vector control method which is used to control the direction of a current vector.

Figure 2:
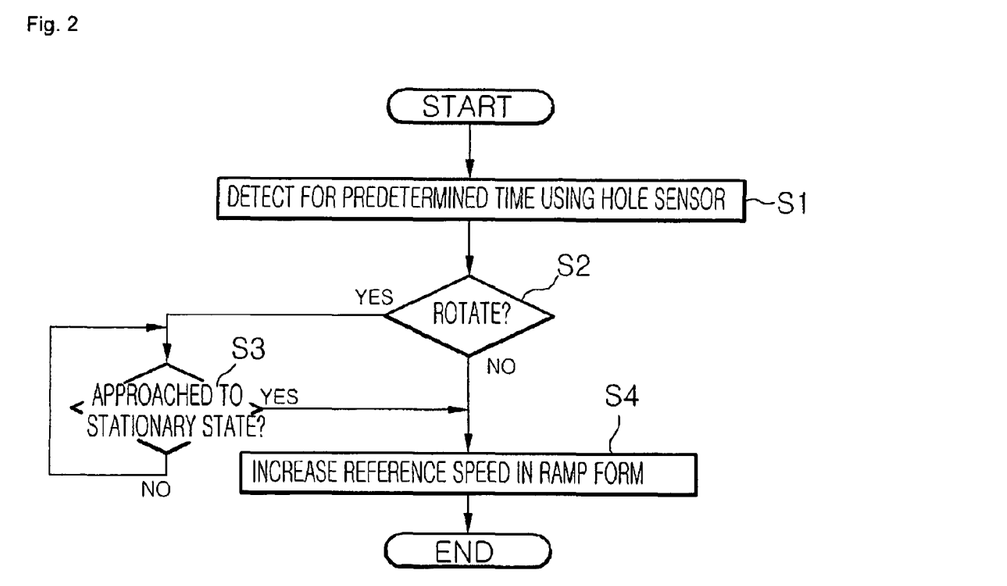
FIG. 2 is a flowchart for explaining a method for starting the motor according to an embodiment.

FIG. 2 is a flowchart for explaining a method for starting a motor according to an embodiment.

Referring to FIG. 2, when the motor starts to operate, the present position of a rotor of the motor is detected with resolution of 60 degrees by using on-off signals output from hall sensors. The speed and rotation direction of the rotor can be detected based on the variation of the on-off signals output from the hall sensors (operation S1).

For example, among sequentially arranged first to third hall sensors (not shown), if the first hall sensor changes from on-state to off-state and the second hall sensor changes from off-state to on-state, it can be determined that the rotor has rotated 60 degrees in electric angle. The arrangement of the hall sensors may be varied in many ways, and thus the method of detecting the speed and rotation direction of the rotor may be varied according to the arrangements of the hall sensors and permanent magnets of the rotor. For example, arrangement state of on-off signals output from the hall sensors may be determined in a predetermined order according to the arrangements of the hall sensors and the permanent magnets. Nevertheless, the speed and rotation direction of the rotor can be detected with resolution of an electric angle of 60 degrees.

After detecting the rotation state and rotation direction of the rotor using the on-off signals output from the hall sensors, it is determined whether the rotor rotates (operation S2). This determination can be performed based on the variation of the signals output from the hall sensors. If it is determined that the rotator rotates, the rotor is forced to stop (operation S3), and if it is determined that the rotor does not rotate, a reference speed ω* is increased in a ramp form (operation S4)

If the speed of the rotor approaches zero in operation S3, the procedure goes to operation S4 to increase the speed of the rotor in a ramp form.

In operation S3 for making the speed of the rotor zero, if the rotor approaches a stationary state, the procedure goes to operation S4 to increase the speed of the rotor in a ramp form.

In the motor starting method, operation S3 for making the speed of the rotor zero will now be described in more detail with reference to the motor M and the control apparatus shown in FIG. 2. If the rotor is initially in a stationary state, the rotor is rotated with gradually increasing speed in a forward direction by a vector control method. A detailed description of the case where the rotor is initially in a stationary state will be omitted.

The speed/position detector 42 continuously estimates and detects the present speed ω of the rotor and outputs the present speed w to the speed controller 41. Then, the speed controller 41 performs a PI operation using the present speed co and a reference speed ω*. In the speed controller 41, subtraction is performed on the present speed ω, and addition is performed on the reference speed ω*. That is, if the rotor is initially rotating in a reverse direction, a difference between the reference speed ω* and the present speed ω is positive—in this operation for making the speed of the rotor zero, the reference speed ω* may be zero—, and thus the rotor is controlled so that the speed of the rotor increases in the forward direction. If the rotor is initially in a forwardly rotating state, the difference between the reference speed ω* and the present speed ω is negative—here, the reference speed ω* may also be zero—, and thus the rotor is decelerated.

The speed controller 41 outputs a d-aix reference current Id* and a q-axis reference current Iq* of a d-q rotating coordinate system according to the speed and rotation direction of the rotor. Here, the reference currents Id* and Iq* are output for stopping the rotor as explained above. The reference currents Id* and Iq* are input to the current controller 43 where the reference currents Id* and Iq* are compared with present currents Id and Iq of the d-q rotating coordinate system for performing a PI control operation. Here, the present currents Id and Iq are currents, which are output from the inverter 52, detected by the current detector 53, and converted by the coordinate converter 44. Then, the current controller 43 outputs reference voltages Vd* and Vq* of the d-q rotating coordinate system.

The reference voltages Vd* and Vq* output from the current controller 43 are converted to reference voltages of an uvw stationary coordinate system by the coordinate converter 44 and are input to the PWM calculator 51. Based on the present angle of the rotor, the coordinate converter 44 outputs the reference voltages of the uvw stationary coordinate system that are adapted for the present state of the rotor.

The PWM calculator 51 generates a PWM signal corresponding to the input reference voltages and outputs the PWM signal to the inverter 52, and transistors (for example, six transistors) of the inverter 52 turn on/off power input to the motor M for operating the motor M. Therefore, the present speed ω of the rotor gradually approaches the reference speed ω*, and eventually, the rotor stops.

The above-described operation is continued until the speed of the rotor approaches zero. In other words, the speed of the rotor is reduced to zero by controlling a current vector of the d-q rotating coordinate system according to a vector control method.

As described below, in the current embodiment, the rotor is forced to be substantially in a stationary state—particularly, even when the rotor is rotated in the forward direction due to any disturbance, the rotor is forced to be in a stationary state. Then, the rotor is controlled to be rotated in the forward direction. Herein, the term "substantially stationary state" of the rotor includes the case where it is determined that the rotor is substantially stopped. In other words, in the current embodiment, since the motor control unit 40 operates using PI controllers, the response characteristics of the PI controllers are considered and thus it can be determined that the rotor is substantially stopped although the speed of the rotor is not exactly zero. Therefore, only if the rotor is substantially stopped, a current vector is applied to rotate the rotor in the forward direction. Thereafter, the motor M is continuously controlled using the same vector control method.

In the following description, when it is expressed that the rotor is in a stationary state or is stopped, the meaning of the expression includes the case where it is determined using the PI controllers that the rotor is stopped and the case where the rotor is substantially stopped by the PI controllers.

As described above, unlike a method of applying a pulse current at a preset position, the motor starting method of the present disclosure is performed in a manner such that the rotor is controlled according to the varying present position of the rotor so as to move the rotor to a predetermined position. Therefore, although there is disturbance such as a strong wind, the motor M can be stably started with less power consumption, noise, and vibration for initial alignment of the rotor of the motor M.

Operation S4 in which a reference speed is increased in a ramp form will now be described in more detail.

Figure 3:
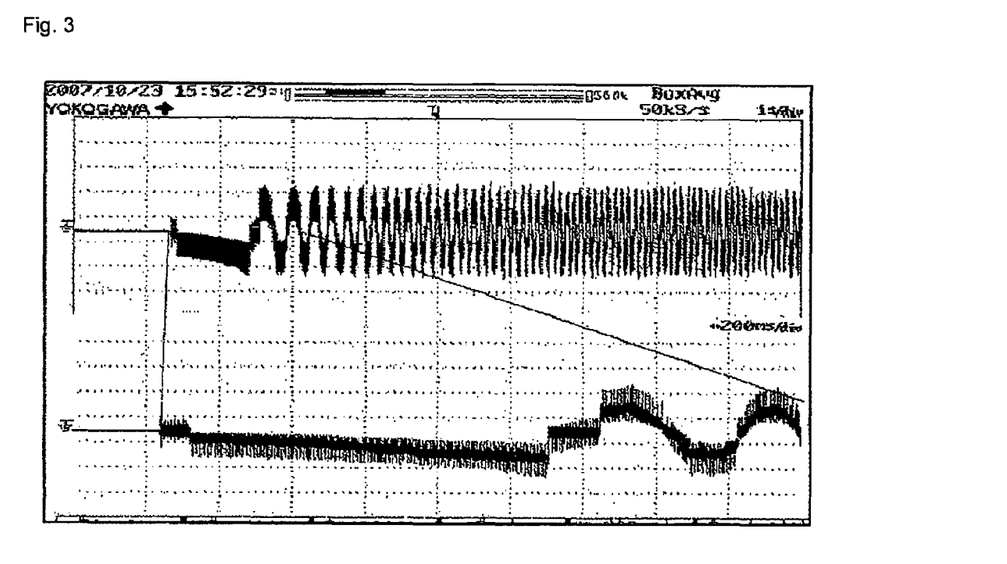
FIG. 3 illustrates a current waveform of one phase in an uvw stationary coordinate system according to an embodiment.

FIG. 3 illustrates a current waveform of one phase in an uvw stationary coordinate system. In FIG. 3, the lower current waveform is an enlarged waveform of an initial section of the upper current waveform.

Referring to FIG. 3, the position of the rotor can be detected with 60-degree resolution since three hall sensors are provided as described above. Therefore, the maximum detection error of a detected position of the rotor is 30 degrees in the forward or reverse direction. Similarly, when the d-axis of the d-q rotating coordinate system is placed on the permanent magnet, the maximum error is 30 degrees in the forward or reverse direction.

The rotor starts to rotate when a rotation magnetic field is applied to the rotor, and after the rotor starts to rotate, a current vector for generating the rotation magnetic field may be continuously applied to provide a rotation force to the rotor continuously, that is, a forward current vector may be applied. If the permanent magnet of the rotor is initially placed on the d-axis, an initial current vector may be applied to a position +15 degrees from the q-axis.

As described above, a current vector is applied according to a detected position of the rotor in a manner such that the current vector is applied to a position +15 degrees from an ideal position because the maximum detection error of the first hall sensor is 30 degrees and the case where the rotor is initially rotating in the forward direction has to be considered. Therefore, for example, when the d-axis has an angle of zero degree, the initial current vector may be applied to a position +105 degrees from the d-axis. However, the motor starting method of the present disclosure is not limited thereto. For example, when the d-axis has an angle of zero degree, the initial current vector may be applied to a position ranging 45 degrees to 165 degrees from the d-axis. In the range from 45 degrees to 165 degrees, a forward torque is always applied to the rotor. This may be sufficiently understood with reference to FIG. 10; for this, in FIG. 10, the d-axis has to be moved to the zero-degree line.

Thereafter, the direction and magnitude of the current vector is varied in a stepped form according to rotor position information detected by the hall sensors with frequency of 60 degrees.

Referring to FIG. 3, six current values are generated during a period. In FIG. 3, although a little noise is presented in the vertical direction due to errors such as detection errors of a current sensor, the noise might be negligible. Referring to the current waveform in FIG. 3 along the proceeding direction, it can be understood that an alignment current for forced alignment is not concentrated on one phase.

After a short initial step, the next step having a slight difference from the initial step is presented. Since the rotor has positioned near the next hall sensor, the next step is rapidly presented. After a period of 360 degrees, the speed of the motor M increases, error reduces, the shape of the current vector is changed to a sinusoidal waveform, and the frequency of the current vector increases gradually. It is apparent that the speed of the rotor increases in proportion to the frequency of the current vector.

In the motor starting method of the current embodiment, the speed of the rotor is gradually increased—that is, the speed of the rotor is increased in a ramp form—based on information detected using the hall sensors with no forced alignment operation.

FIGS. 4 to 9 show detected phase current curves for various initial speeds and directions of the rotor in the above-described embodiment. A further detailed explanation will now be made with reference to FIGS. 4 to 9.

Figure 4:
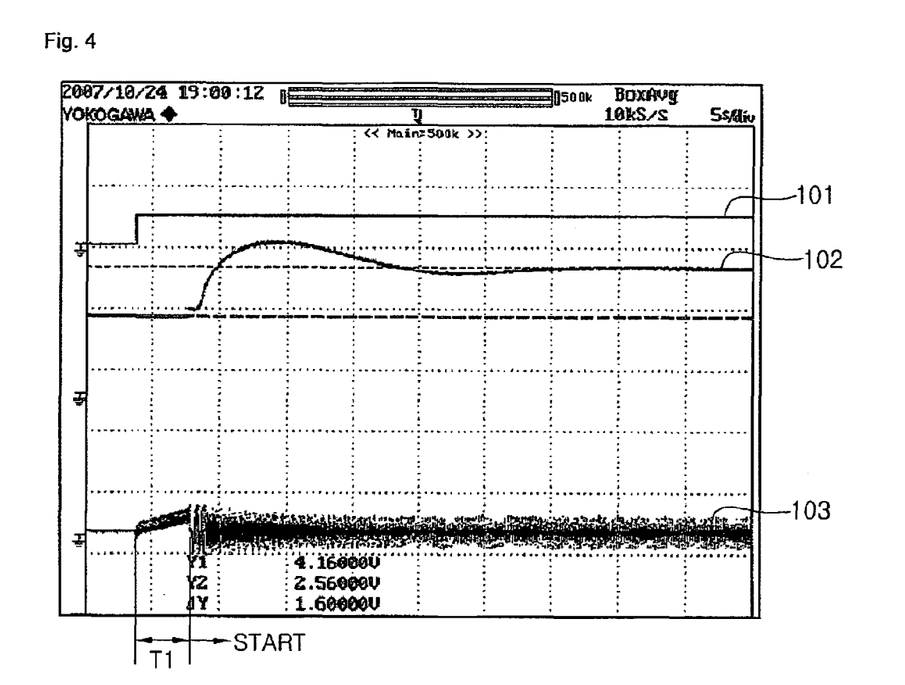
FIG. 4 illustrates a phase current graph for the case where the motor is started from an initial state where a rotor of the motor is stationary at a zero-degree position.

FIG. 4 illustrates a phase current graph for the case where the motor is started from an initial state where the rotor of the motor is stationary at a zero-degree position.

Referring to FIG. 4, reference numerals 101, 102, and 103 denote a start reference curve, a speed curve calculated by the speed/position detector 42, and a phase current curve, respectively. When a start signal is input, a phase current corresponding to the phase detected by the hall sensor is applied to rotate the rotor of the motor. For example, if it is detected that the rotor is on the d-axis, a current vector is applied to a position +105 degrees from the d-axis. Thereafter, the phase current is varied according to the rotor position information detected by the hall sensors.

After a time T1, the rotor is rotated with somewhat stable speed. Then, the rotor is further rotated according to rotor position and speed information estimated by the speed/position detector 42.

Figure 5:
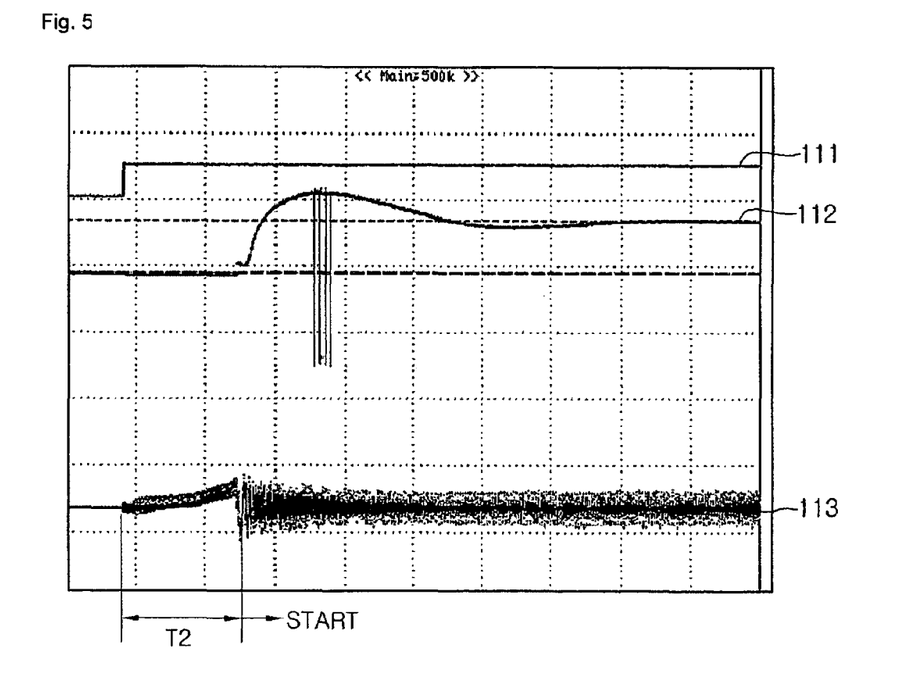
FIG. 5 illustrates a phase current graph for the case where the motor is started from a state where the rotor of the motor is initially out of position by 15 degrees.

FIG. 5 illustrates a phase current graph for the case where the motor M is started from a state where the rotor of the motor M is initially out of position by 15 degrees.

Referring to FIG. 5, reference numerals 111, 112, and 113 denote a start reference curve, a speed curve calculated by the speed/position detector 42, and a phase current curve, respectively. The phase current graph of FIG. 5 is substantially the same as that of FIG. 4 except that a time T2 required for the rotor to be stably rotated is longer than the time T1 of the graph of FIG. 4. Since the initial position of the rotor is deviated from a desired initial start position of the rotor, a longer time is required for initial driving of the rotor.

Figure 6:
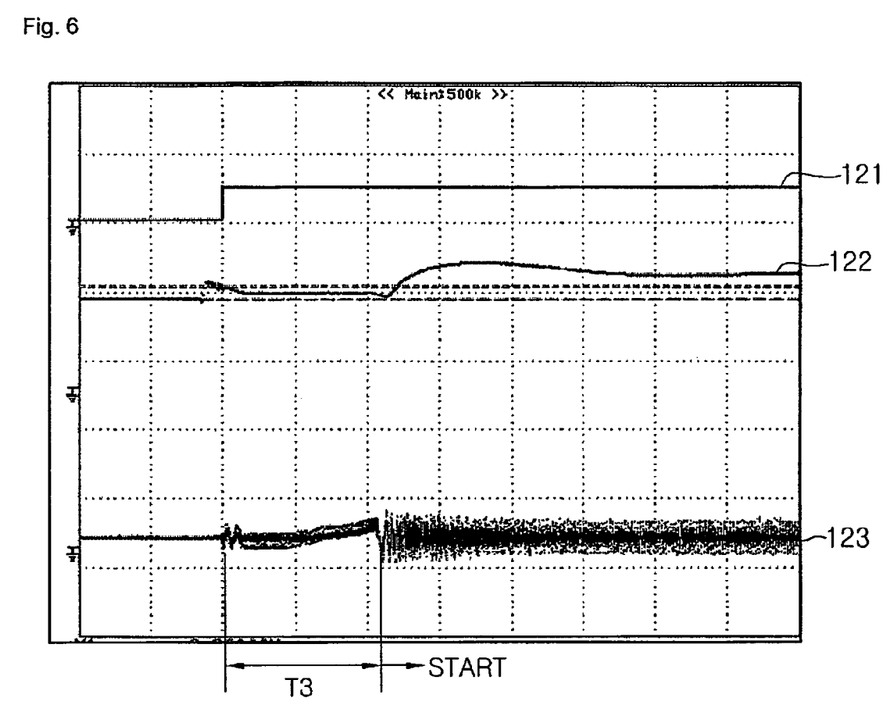
FIG. 6 illustrates a phase current graph for the case where the motor is started from a state where the rotor of the motor is initially rotated at 44 rpm in a forward direction.

FIG. 6 illustrates a phase current graph for the case where the motor M is started from a state where the rotor of the motor M is initially rotated at 44 rpm in the forward direction.

Referring to FIG. 6, reference numerals 121, 122, and 123 denote a start reference curve, a speed curve calculated by the speed/position detector 42, and a phase current curve, respectively. The phase current graph of FIG. 6 is substantially the same as that of FIG. 4 except for the fact that an initial phase current is applied to decelerate the forwardly rotating rotor to a stationary state. The initial phase current is a current vector applied in the reverse direction for decelerating the forwardly rotating rotor to a stationary state. Thereafter, like in the case of FIG. 4, a forward phase current is applied so as to rotate the rotor in the forward direction.

After a time T3, the rotor is stably rotated at a predetermined speed.

Figure 7:
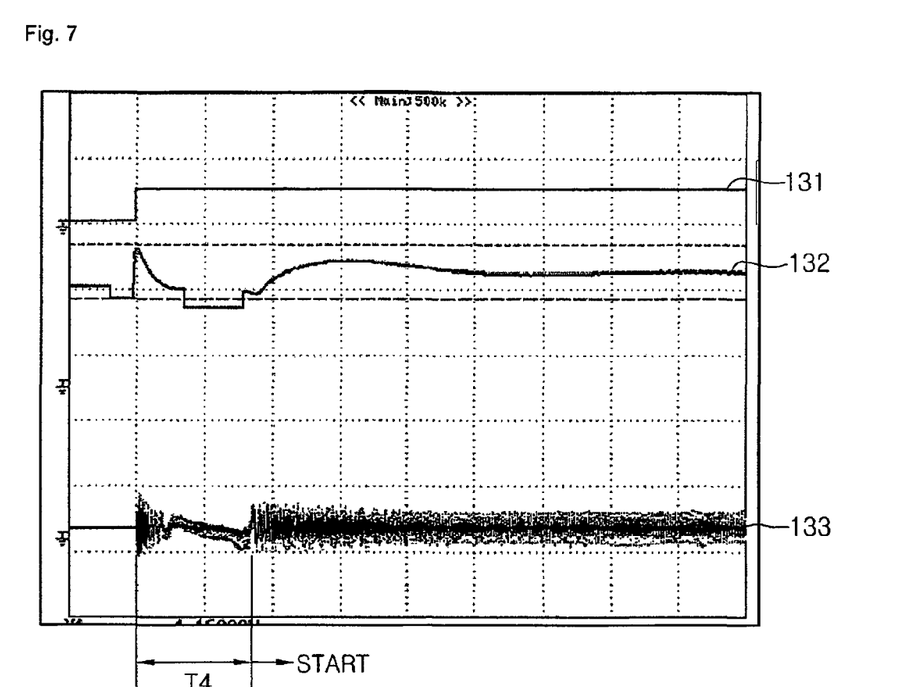
FIG. 7 illustrates a phase current graph for the case where the motor M is started from a state where the rotor of the motor is initially rotated at 201 rpm in the forward direction.

FIG. 7 illustrates a phase current graph for the case where the motor M is started from a state where the rotor of the motor M is initially rotated at 201 rpm in the forward direction.

Referring to FIG. 7, reference numerals 131, 132, and 133 denote a start reference curve, a speed curve calculated by the speed/position detector 42, and a phase current curve, respectively. The phase current graph of FIG. 7 is substantially the same as that of FIG. 6 except for the fact that a relatively great initial phase current is applied to decelerate the forwardly rotating rotor to a stationary state. Since the rotor is rotated at a relatively high speed in the forward direction, more energy is required to decelerate the rotor to a stationary state. Although undershoot can occur when the rotor is decelerated, the undershoot does not significantly affect the deceleration operation.

After a time T4, the rotor is stably rotated at a predetermined speed.

Figure 8:
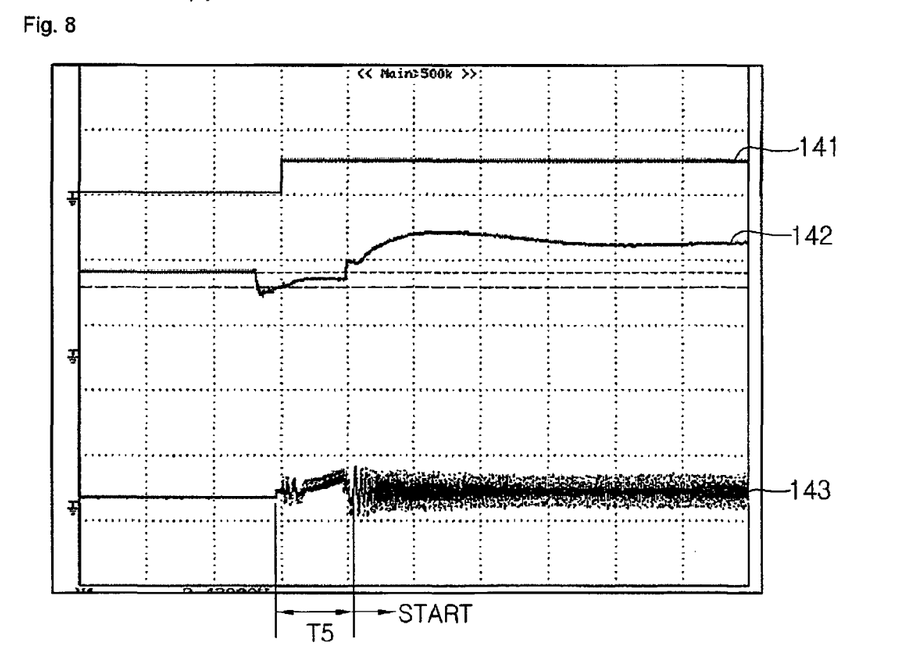
FIG. 8 illustrates a phase current graph for the case where the motor is started from a state where the rotor of the motor is initially rotated at 57 rpm in a reverse direction.

FIG. 8 illustrates a phase current graph for the case where the motor M is started from a state where the rotor of the motor M is initially rotated at 57 rpm in the reverse direction.

Referring to FIG. 8, reference numerals 141, 142, and 143 denote a start reference curve, a speed curve calculated by the speed/position detector 42, and a phase current curve, respectively. The phase current graph of FIG. 8 is substantially the same as that of FIG. 4 except for the fact that an initial phase current is applied to decelerate the reversely rotating rotor to a stationary state. The initial phase current is a current vector applied in an opposite direct to the rotating direction of the rotor for decelerating the reversely rotating rotor to a stationary state.

After a time T5, the rotor is stably rotated at a predetermined speed.

Figure 9:
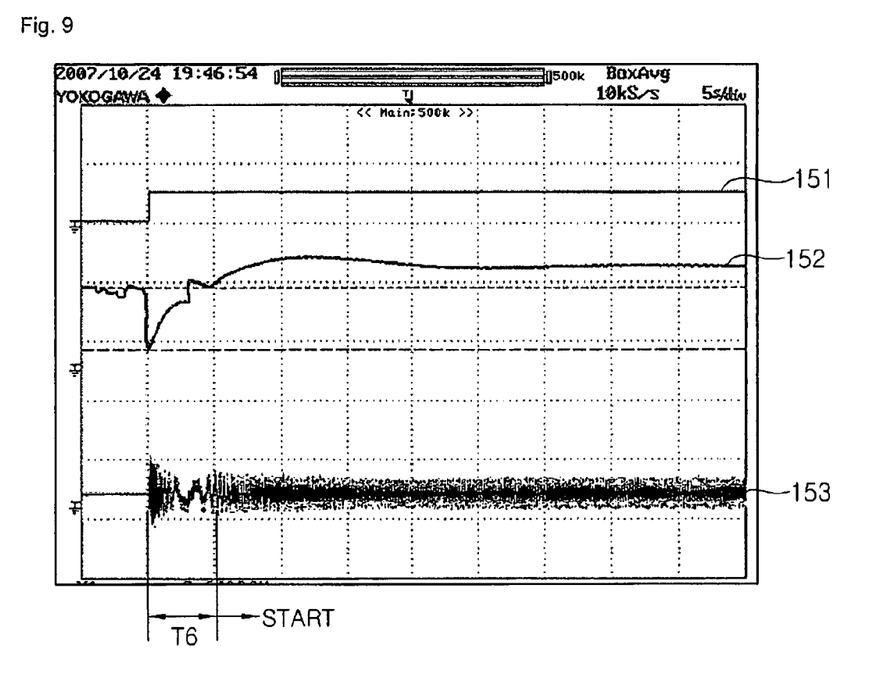
FIG. 9 illustrates a phase current graph for the case where the motor is started from a state where the rotor of the motor is initially rotated at 261 rpm in the reverse direction.

FIG. 9 illustrates a phase current graph for the case where the motor M is started from a state where the rotor of the motor M is initially rotated at 261 rpm in the reverse direction.

Referring to FIG. 9, reference numerals 151, 152, and 153 denote a start reference curve, a speed curve calculated by the speed/position detector 42, and a phase current curve, respectively. The phase current graph of FIG. 9 is substantially the same as that of FIG. 8 except for the fact that a relatively great initial phase current is applied to decelerate the reversely rotating rotor to a stationary state. Since the rotor is rotated at a relatively high speed in the reverse direction, more energy is required to decelerate the rotor to a stationary state. Although overshoot can occur when the rotor is decelerated, the overshoot does not significantly affect the deceleration operation.

After a time T6, the rotor is stably rotated at a predetermined speed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the present disclosure, a motor can be reliably started with less power consumption, noise, and vibration. Furthermore, in the case where the motor is operated under largely varying load conditions, the motor can be stably operated. Particularly, the motor may be suitably used for a fan of an outdoor unit of an air conditioner.

The invention claimed is:

1. A motor comprising a stator around which a coil is wound, a rotor having a permanent magnet spaced a predetermined distance from the stator, and a hall sensor disposed at the stator to detect a present position and a present speed of the rotor, characterized in that the motor further comprises a motor control unit, wherein when the rotor is initially in a stationary state, the motor control unit applies a current vector to the coil by a vector control method so as to rotate the rotor in a forward direction from the present position of the rotor regardless of a predetermined start position of the rotor, wherein when the rotor is initially not in a stationary state, the motor control unit decelerates the rotor substantially to a stationary state by a vector control method.

2. The motor according to claim 1, wherein the hall sensor is at least three in number.

3. The motor according to claim 1, wherein when the rotor starts to rotate from the stationary state, a stepped phase current is applied to the coil.

4. The motor according to claim 1, wherein the motor control unit applies a current vector without applying a forced alignment current to the coil in a predetermined direction.

5. An apparatus for controlling a motor, comprising:
a speed controller configured to generate a d-axis reference current Id* and a q-axis reference current Iq* based on a d-q rotating coordinate system defined by a d-axis parallel with a magnetic flux direction of a permanent magnet and a q-axis perpendicular to the magnetic flux direction;
a current controller configured to generate a d-axis reference voltage Vd* and a q-axis reference voltage Vq* based on the d-axis reference current Id* and the q-axis reference current Iq*;
a pulse width modulation (PWM) calculator configured to generate a PWM signal based on the d-axis reference voltage Vd* and the q-axis reference voltage Vq*;
an inverter configured to generate a current using the PWM signal for applying the current to the motor; and
a speed/position detector configured to detect a speed and a position of a rotor of the motor,
wherein when the speed/position detector detects that the rotor is in a stationary state, the speed controller outputs a reference current to cause the rotor to start rotating in a forward direction,
wherein when the rotor is not in a stationary state, a variable current vector is applied by a vector control method to stop the rotor substantially, and then the rotor is rotated in the forward direction.

6. The apparatus according to claim 5, wherein the current vector comprises at least a q-axis component in the d-q rotating coordinate system.

7. A method for starting a motor, comprising:
detecting a position and a speed of a rotor; and
when the rotor is in a stationary state, applying a current vector according to a vector control method so as to cause the rotor to start rotating from a stationary position in a forward direction,
wherein when the detected speed of the rotor is a forward or reverse speed, the rotor is decelerated substantially to a stationary state, and then the rotor is started to rotate.

8. The method according to claim 7, wherein the position of the rotor is detected with resolution of 60 degrees.

9. The method according to claim 7, wherein the rotor is started to rotate by the vector control method no matter whether the rotor is in a stationary state or the speed of the rotor is a forward or reverse speed.

10. The method according to claim 7, wherein a unidirectional forced alignment current is not applied regardless of an initial state of the rotor.

11. The method according to claim 7, wherein the position of the rotor is detected using a combination of on/off signals output from at least three hall sensors disposed at a stator.

* * * * *